United States Patent
Elwart et al.

(10) Patent No.: US 7,600,375 B2
(45) Date of Patent: Oct. 13, 2009

(54) CATALYTIC DEVICE WITH FUEL CELL PORTION AND CATALYTIC CONVERSION PORTION

(75) Inventors: Shane Elwart, Ypsilanti, MI (US); James Kerns, Trenton, MI (US); Gopichandra Surnilla, West Bloomfield, MI (US); David Bidner, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 51 days.

(21) Appl. No.: 11/354,412

(22) Filed: Feb. 14, 2006

(65) Prior Publication Data

US 2007/0186544 A1    Aug. 16, 2007

(51) Int. Cl.
*F01N 3/10* (2006.01)
(52) U.S. Cl. .............. 60/299; 60/274; 60/275; 60/285; 204/177; 204/179; 429/19; 429/40; 429/43
(58) Field of Classification Search .......... 60/274, 60/275, 285, 286, 299, 300; 204/177, 179; 429/19, 40, 42, 43
See application file for complete search history.

(56) References Cited

U.S. PATENT DOCUMENTS

| | | | | |
|---|---|---|---|---|
| 4,253,925 A * | 3/1981 | Mason | ................. | 205/617 |
| 5,456,807 A * | 10/1995 | Wachsman | ................. | 205/617 |
| 5,968,456 A * | 10/1999 | Parise | ................. | 422/174 |
| 6,357,223 B1 * | 3/2002 | Caren et al. | ................. | 60/274 |
| 6,588,211 B2 * | 7/2003 | Friebe et al. | ................. | 60/716 |
| 6,655,325 B1 * | 12/2003 | Botti et al. | ................. | 123/3 |
| 6,675,573 B2 * | 1/2004 | Kempfer | ................. | 60/284 |
| 6,759,155 B2 * | 7/2004 | Haltiner, Jr. | ................. | 429/17 |
| 6,986,247 B1 * | 1/2006 | Parise | ................. | 60/284 |
| 6,994,930 B1 * | 2/2006 | Geisbrecht et al. | ................. | 429/19 |
| 7,014,930 B2 * | 3/2006 | Daniel et al. | ................. | 429/17 |
| 7,100,369 B2 * | 9/2006 | Yamaguchi et al. | ................. | 60/324 |
| 7,178,332 B2 * | 2/2007 | Sasaki | ................. | 60/320 |
| 2004/0053087 A1 | 3/2004 | Akikusa et al. | | |
| 2004/0126640 A1 | 7/2004 | Sanderson | | |
| 2004/0177607 A1 * | 9/2004 | Suzuki et al. | ................. | 60/286 |
| 2006/0063046 A1 * | 3/2006 | Hu et al. | ................. | 429/17 |

FOREIGN PATENT DOCUMENTS

JP    2002-175824    6/2002

\* cited by examiner

*Primary Examiner*—Binh Q Tran
(74) *Attorney, Agent, or Firm*—Allan J. Lippa; Alleman Hall McCoy Russell & Tuttle LLP

(57) ABSTRACT

An apparatus comprising an internal combustion engine, an exhaust system for conducting exhaust emitted by the engine, and a catalytic device associated with the exhaust system is disclosed, wherein the catalytic device comprises a catalytic conversion portion and a fuel cell portion.

30 Claims, 3 Drawing Sheets

CATALYTIC DEVICE WITH FUEL CELL PORTION AND CATALYTIC CONVERSION PORTION

TECHNICAL FIELD

The present disclosure relates generally to emissions systems for internal combustion engines.

BACKGROUND AND SUMMARY

Internal combustion engines typically use only a portion (for example, approximately 31% to 38% in some cases) of the energy in supplied fuel due to wasted heat, friction, incomplete combustion, and others such factors. In addition, approximately 3-17% of the supplied fuel energy may be used to maintain the engine operation during standby and another 1-2% may be used to operate accessories. Therefore, it may be beneficial to utilize waste energy, typically in the form of thermal and chemical energy, to improve overall fuel efficiency.

One approach to utilize the waste energy is to arrange a solid oxide fuel cell (SOFC) in an exhaust system of an internal combustion engine. For example, U.S. Patent Application No. 2004/0177607 describes an internal combustion engine with a SOFC in an exhaust system. This reference also describes oxidative catalysts disposed upstream and downstream of the SOFC within the exhaust system. The upstream oxidative catalyst is used to reform fuel for the SOFC, and the downstream oxidative catalyst is used to treat any unoxidized or partially oxidized exhaust constituents not consumed by the SOFC. However, such a system may still waste not utilize energy efficiently. For example, heat from oxidative reactions occurring in the oxidative catalyst may be lost in such a system.

The inventors herein have realized that waste energy may be more efficiently utilized by an apparatus comprising an internal combustion engine, an exhaust system for conducting exhaust emitted by the engine, and a catalytic device associated with the exhaust system, wherein the catalytic device comprises a catalytic conversion portion and a fuel cell portion. Such an apparatus may allow heat from chemical reactions in the catalytic conversion portion to assist in heating the fuel cell portion of the catalytic device, and may offer other benefits as well.

DETAILED DESCRIPTION OF THE DEPICTED EMBODIMENTS

Figure 1:
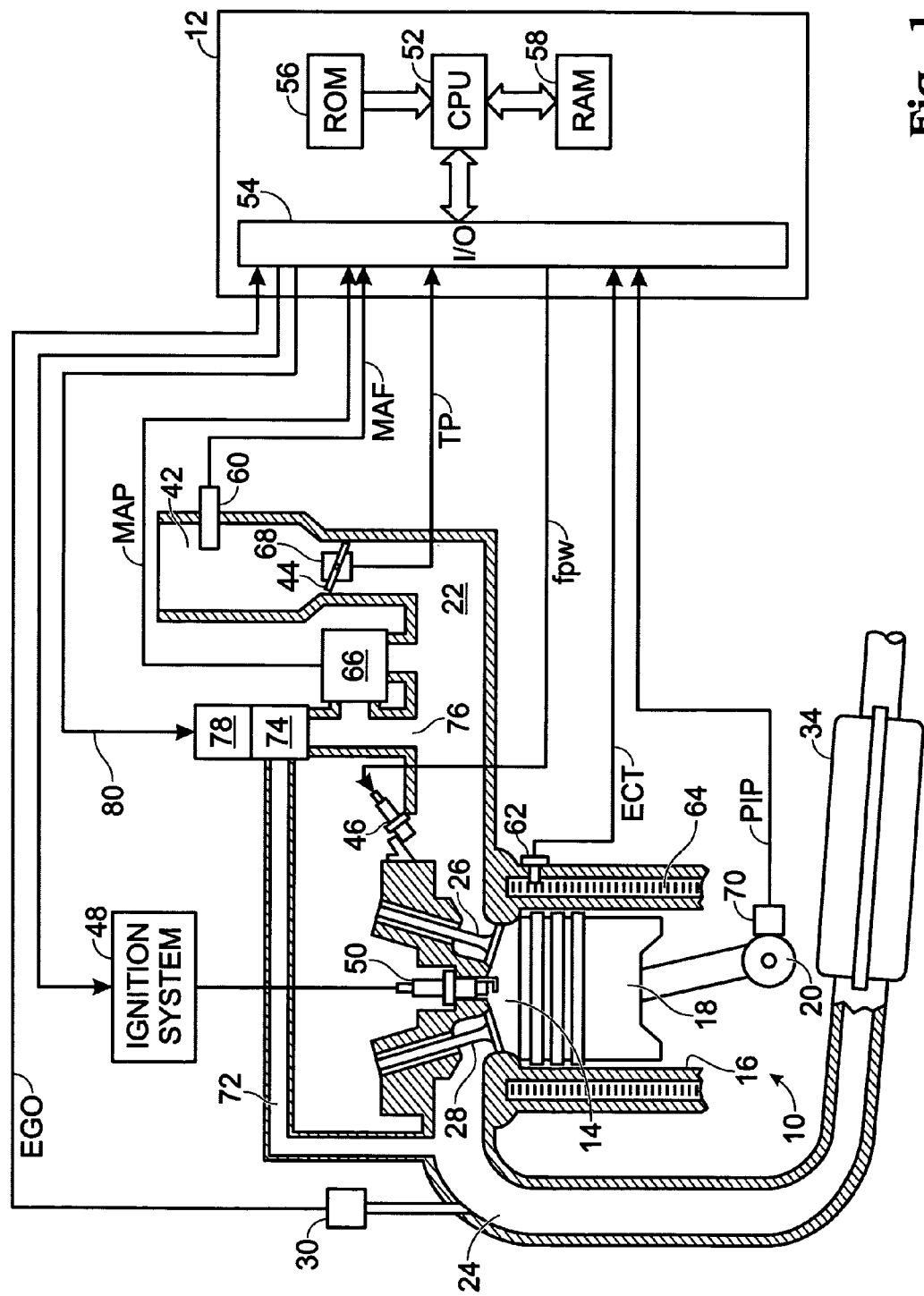
FIG. 1 is a schematic diagram of an exemplary embodiment of an internal combustion engine.

FIG. 1 shows a schematic depiction of an exemplary embodiment of an internal combustion engine 10. Engine 10 typically includes a plurality of cylinders, one of which is shown in FIG. 1, and is controlled by an electronic engine controller 12. Engine 10 includes a combustion chamber 14 and cylinder walls 16 with a piston 18 positioned therein and connected to a crankshaft 20. Combustion chamber 14 communicates with an intake manifold 22 and an exhaust manifold 24 via a respective intake valve 26 and exhaust valve 28. An exhaust gas oxygen sensor 30 is coupled to exhaust manifold 24 of engine 10. A catalytic device 34 is connected to and receives exhaust gases from exhaust manifold 24. Catalytic device 34 includes both a fuel cell portion and a catalytic conversion portion, as discussed in detail below.

Engine 10 is depicted as a port-injection spark-ignition gasoline engine. However, it will be appreciated that the systems and methods disclosed herein may be used with any other suitable engine, including direct-injection engines, and compression ignition engines including but not limited to diesel engines.

Intake manifold 22 communicates with a throttle body 42 via a throttle plate 44. Intake manifold 22 is also shown having a fuel injector 46 coupled thereto for delivering fuel in proportion to the pulse width of signal (fpw) from controller 12. Alternatively, a direct injection mechanism (not shown) in which fuel is injected directly into the combustion chamber may be used. Fuel is delivered to fuel injector 46 by a conventional fuel system (not shown) including a fuel tank, fuel pump, and fuel rail (not shown). Engine 10 further includes a conventional distributorless ignition system 48 to provide an ignition spark to combustion chamber 30 via a spark plug 50 in response to controller 12. In the embodiment described herein, controller 12 is a conventional microcomputer including: a microprocessor unit 52, input/output ports 54, an electronic memory chip 56, which is an electronically programmable memory in this particular example, a random access memory 58, and a conventional data bus.

Controller 12 receives various signals from sensors coupled to engine 10, including: measurements of inducted mass air flow (MAF) from a mass air flow sensor 60 coupled to throttle body 42; engine coolant temperature (ECT) from a temperature sensor 62 coupled to cooling jacket 64; a measurement of manifold pressure (MAP) from a manifold absolute pressure sensor 66 coupled to intake manifold 22; a measurement of throttle position (TP) from a throttle position sensor 68 coupled to throttle plate 44; and a profile ignition pickup signal (PIP) from a Hall effect sensor 70 coupled to crankshaft 40 indicating an engine speed (N).

Exhaust gas is delivered to intake manifold 22 by a conventional EGR tube 72 communicating with exhaust manifold 24, EGR valve assembly 74, and EGR orifice 76. Alternatively, tube 72 could be an internally routed passage in the engine that communicates between exhaust manifold 24 and intake manifold 22. A vacuum regulator 78 is coupled to EGR valve assembly 74. Vacuum regulator 78 receives actuation signal on line 80 from controller 12 for controlling valve position of EGR valve assembly 74.

Figure 2:
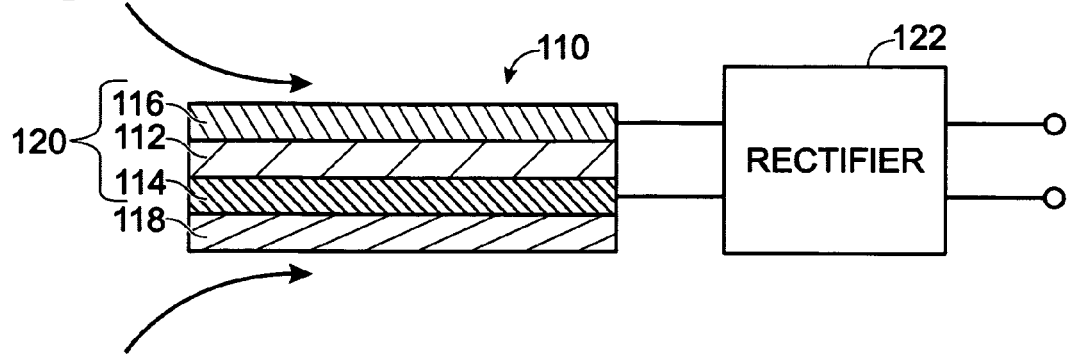
FIG. 2 is a schematic diagram of an exemplary embodiment of a catalytic device comprising a fuel cell portion and a catalytic conversion portion.

Catalytic device 34 includes an internal structure having a fuel cell portion and a catalytic conversion portion. FIG. 2 shows a schematic diagram of an exemplary embodiment of an internal structure 110 of catalytic device 34. Internal structure 110 includes a support 112, an anode 114 supported by a first surface of support 112, a cathode 116 supported by a second surface of support 112, and a catalytic conversion structure 118 supported by the first surface of support 112. FIG. 2 shows anode 114 and cathode 116 disposed on opposite sides of support 112, and catalytic conversion structure 118 disposed on anode 114. However, it will be appreciated that other intermediate layers between these layers may be used. Furthermore, it will be understood that catalytic conversion structure 118 may be disposed over only portions of anode 114, or may substantially cover anode 114. Likewise, anode 114 and cathode 116 may each completely cover the respective support surfaces, or only partially cover the support surfaces. Additionally, while the term "internal structure" is used to describe the structure forming and/or supporting the fuel cell and catalytic conversion structures, it will be appreciated that at least portions of the internal structure 110 may be exposed to the atmosphere outside of catalytic device 34, as described in more detail below.

Support 112, anode 114, and cathode 116 cooperate to form a fuel cell structure 120 for generating an electrical potential from unoxidized and/or partially oxidized exhaust components supplied to anode 114, in combination with oxygen (or other oxygen-containing oxidant) supplied to cathode 116. Examples of exhaust components that may be used as fuel by fuel cell structure 120 include, but are not limited to, hydrogen, carbon monoxide, and unoxidized and partially oxidized hydrocarbons.

Catalytic conversion structure 118 may be configured to be porous or otherwise permeable by exhaust gases so that such exhaust gases may reach those portions of anode 114 covered by catalytic conversion structure 118 for consumption by fuel cell structure 120. Furthermore, catalytic conversion structure 118 may help to reform hydrocarbons in the exhaust, thereby forming more fuel for fuel cell structure 120. Catalytic conversion structure 118 additionally may oxidize any hydrogen, carbon monoxide, hydrocarbons, and other oxidizable exhaust components not consumed by fuel cell structure 120, and also may be configured to reduce $NO_x$ emissions. In this manner, catalytic conversion structure 118 and fuel cell structure 120 may cooperate to generate an electrical potential from exhaust gases and to reduce the concentration of undesirable emissions in the exhaust from engine 10.

The use of catalytic device 34 may offer various advantages over the use of separate oxidative catalytic devices and fuel cells in an emissions system. For example, in applications where a catalytic converter is separated from a fuel cell along an exhaust system, heat produced by the catalytic reactions within the catalytic conversion device may be lost. In contrast, the configuration of fuel cell structure 120 and catalytic conversion structure 118 may allow heat produced by reactions catalyzed by catalytic conversion structure 118 to be used to heat fuel cell structure 120. This may be helpful, as the thermal energy that would otherwise be wasted in a conventional catalytic converter system may be used to heat fuel cell structure 120 to its ordinary operating temperatures, which may be on the order of 800-1000 degrees Celsius. Furthermore, the use of catalytic device 34 may help to reduce the number of components used in an emissions system relative to the use of a separate catalytic converter and fuel cell.

Engine 10 may be operated in such a manner that the engine produces alternating periods of rich and lean exhaust. Such an oscillation of the air/fuel ratio is often used, for example, with three-way catalysts for ordinary catalyst operation. In the context of catalytic device 34, periods of rich exhaust may be used to supply fuel to fuel cell structure 120, and periods of lean exhaust may be used to increase the oxygen content of catalytic conversion structure 118 to facilitate the catalytic oxidation of exhaust components. In some embodiments, the oscillation of the air/fuel ratio may be conducted substantially symmetrically about the stoichiometric point, while in other embodiments the air/fuel ratio may be oscillated about a midpoint offset from the stoichiometric point, either to the rich side or lean side of stoichiometry. Oscillating the air/fuel ratio about a midpoint richer than the stoichiometric point may provide more fuel in the form of unoxidized and partially oxidized exhaust products to fuel cell structure 120 relative to oscillating the air/fuel ratio about the stoichiometric point or a leaner ratio.

In some embodiments, a rectifier 122 may be used to smooth the output of fuel cell structure 120. Rectifier 122 may be used, for example, in embodiments in which an oscillating or otherwise variable air/fuel ratio is used to operate engine 10, as the oscillation of the air/fuel ratio may produce an uneven fuel cell output. Any suitable rectification circuit or circuits may be used as rectifier 122. Suitable circuits include circuits configured to output a suitable voltage and/or current for a desired application. For example, rectifier 122 may include one or more diodes or like circuit elements to help prevent reversal of current flow in the event of variations in exhaust composition.

Any suitable material may be used as support 112. For example, in some embodiments, support 112 may be made at least partially of a solid electrolyte material capable of conducting oxygen ions between cathode 116 and anode 114. In other embodiments, support 112 may be made from a material that is not ionically conductive, but that is coated with an ionic conductor such that an ionically conductive path exists between cathode 116 and anode 114. In yet other embodiments, support 112 may be formed from more than one ionically conductive material. Examples of suitable ionically conductive materials for support 112 may include, but are not limited to, zirconium oxide-based materials. Support 112 may have a honeycomb-like structure typically used in the construction of three-way catalytic converters, or may have any other suitable structure.

Likewise, anode 114 and cathode 116 may be formed from any suitable material or materials. Suitable materials for use as anode 114 and cathode 116 include materials having similar thermal expansion characteristics as support 112, as internal structure 110 of catalytic device 34 may undergo thermal cycling from very cold temperatures (for example, while engine 10 is at rest in a cold climate) to the very hot temperatures often used to operate solid oxide fuel cells. As a prophetic example, it may be possible to use materials similar in design to EGO, UEGO, NOx sensors, where the thermal expansion rates of the materials are selected so as to reduce or eliminate the transfer of species from the anode and cathode layer. This is because, for example, these types of sensors are generally configured to be capable of operation under the same environmental conditions as a solid oxide fuel cell.

Catalytic conversion structure 118 also may be formed from any suitable material or materials. Suitable materials include, but are not limited to, conventional three-way catalytic wash coats. Such wash coats may include, but are not limited to, barium and cerium as well as platinum group metals including, but not limited to platinum, palladium and rhodium.

Catalytic device 34 may include a structure for preventing oxidant and fuel from reaching the incorrect electrodes. For example, support 112 may have a honeycomb-like interior configuration, and a continuous outer surface formed at least partially from an ionically conductive material (or coated with an ionically conductive material) surrounding the honeycomb material, thereby containing exhaust gases within the honeycomb material. In these embodiments, anode 114 may be deposited over internal surfaces of support 112, and cathode 116 may be deposited over the outside face of the continuous outer surface of support 112. Exhaust from engine 10 may be directed into the internal portions of support 112, and the continuous outer surface of the support may prevent the exhaust from reaching cathode 116.

Figure 3:
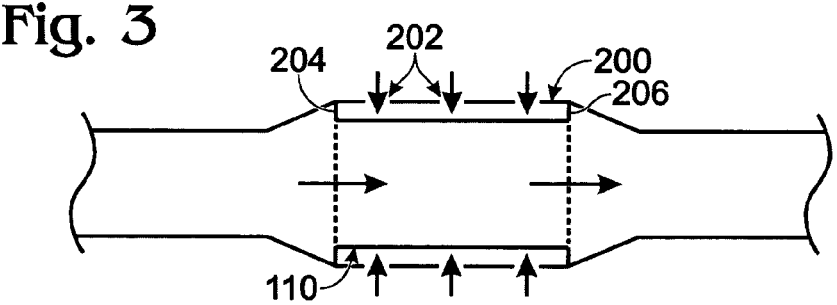
FIG. 3 is a schematic view of an exemplary embodiment of a catalytic device comprising a fuel cell portion and a catalytic conversion portion, illustrating a first exemplary oxidant inlet.

Catalytic device 34 may be configured to provide oxidant to cathode 116 in any suitable manner. For example, catalytic device 34 may be configured to provide air to cathode 116. FIG. 3 shows a schematic depiction of a structure for providing ambient air to cathode 116, and for preventing air from reaching anode 114. Catalytic device 34 includes an outer casing 200 substantially enclosing internal structure 110. Outer casing 200 includes one or more openings 202 configured to allow air to reach cathode 116 disposed on the outer surface of support 112. Furthermore, a seal 204 may be provided between an upstream end of internal structure 110 and outer casing 200, thereby preventing exhaust gases from reaching cathode 116. An additional seal 206 may be provided between a downstream end of internal structure 110 and outer casing 200, thereby offering further protection against oxygen from reaching the anode and exhaust gases from reaching the cathode.

In some embodiments, catalytic device 34 may be configured to receive oxidant gases from a source other than ambient air. For example, in some embodiments, catalytic device may be configured to receive oxidant gases for use by cathode 116 from one or more engine cylinders that are configured to produce lean exhaust. In these embodiments, different cylinders in engine 10 may be configured to operate simultaneously at different air/fuel ratios.

Figure 4:
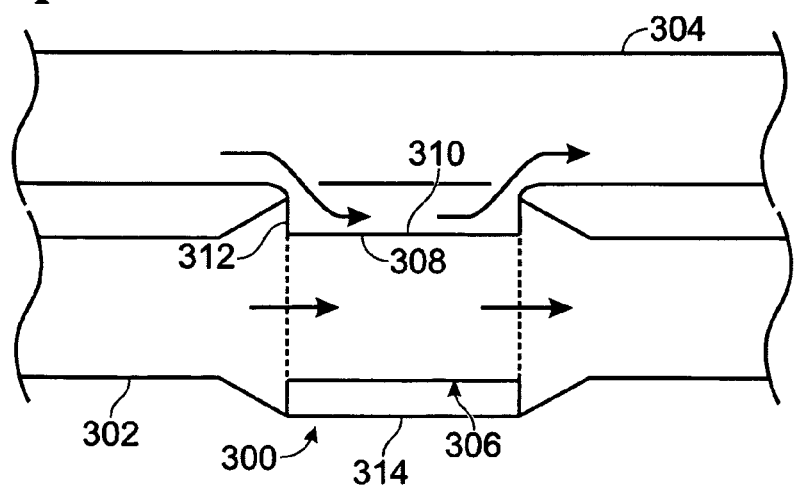
FIG. 4 is a schematic view of an exemplary embodiment of a catalytic device comprising a fuel cell portion and a catalytic conversion portion, illustrating a second exemplary oxidant inlet.

FIG. 4 shows, generally at 300, a schematic depiction of an embodiment of a catalytic device configured to receive oxidant gases from one or more engine cylinders. Catalytic device 300 is configured to receive exhaust from a first exhaust conduit 302 for providing a first input to a first electrode, and exhaust from a second exhaust conduit 304 for providing a second input to a second electrode. An internal structure 306 includes a fuel cell structure and a catalytic conversion structure, as described above in the context of the embodiment of FIG. 2. The first electrode (not shown) is formed on or adjacent to (or is otherwise supported by) an interior surface 308 of internal structure 306, and the second electrode (not shown) is formed on or adjacent to (or is otherwise supported by) an outer surface 310 of internal structure 306.

In some embodiments, the first input from first exhaust conduit 302 may be exhaust from rich-burning cylinders and the second input from second exhaust conduit 304 may be exhaust from lean-burning cylinders. In these embodiments, the first electrode may be an anode and the second electrode may be a cathode.

In other embodiments, the first input from first exhaust conduit 302 may be exhaust from lean-burning cylinders and the second input from second exhaust conduit 304 may be exhaust from rich-burning cylinders. In these embodiments, the first electrode may be a cathode and the second electrode may be an anode. In either case, a seal 312 may be provided between an upstream end of internal structure 306 and an outer casing 314 to prevent exhaust gases from first exhaust conduit 302 from reaching the second electrode adjacent to outer surface 310 of structure 306, and to prevent exhaust gases from second exhaust conduit 304 from reaching the first electrode adjacent to interior surface 308.

Furthermore, casing 314 may be configured to contain exhaust gases such that exhaust gases that flow into catalytic device 300 through second exhaust conduit 304 and that are not consumed by the fuel cell structure flow out of casing 314 through second exhaust conduit 304. Additional catalytic devices may be disposed in second exhaust conduit 304 and/or first exhaust conduit where desired. It will be appreciated that a catalytic conversion structure (for example, a three-way catalyst wash coat) may be disposed partially or fully over either of the first electrode on interior surface 308 of internal structure 306, and/or over the second electrode on the exterior surface 310 of internal structure 306.

Figure 5:
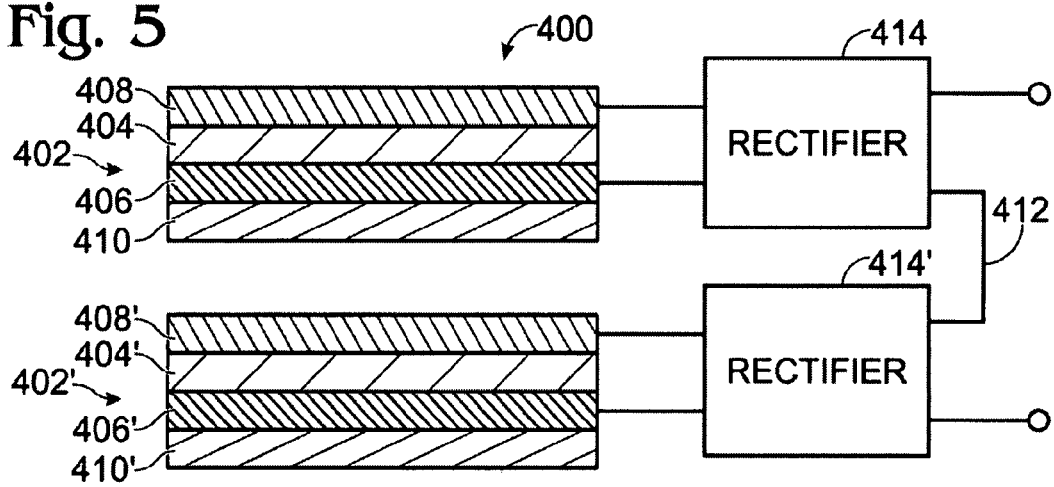
FIG. 5 is a schematic view of an exemplary embodiment of a catalytic device comprising a plurality of fuel cell portions.

FIG. 5 shows, generally at 400, a schematic depiction of another embodiment of a catalytic device having a fuel cell portion and a catalytic conversion portion. Catalytic device 400, which may be disposed within a casing such as those disclosed above, includes a first fuel cell structure 402 and a second fuel cell structure 402'. Each fuel cell structure includes a support (404, 404'), a first electrode (406, 406'), a second electrode (408, 408') and a catalytic converter structure (410, 410'). The operation of each individual fuel cell structure 402, 402' is similar to that described above for catalytic device 34, and is therefore not described in further detail. The output of fuel cell structures 402, 402' may be connected in series to increase the total voltage output, as illustrates schematically at 412. This may allow catalytic device 400 to be used in higher voltage applications than catalytic device 34. One or more rectifiers 414, 414' may be used to smooth the output of the fuel cell structures. Rectifiers 414, 414' may include one or more diodes or like circuit elements to help prevent reversal of current flow in the event of variations in exhaust composition.

Figure 6:
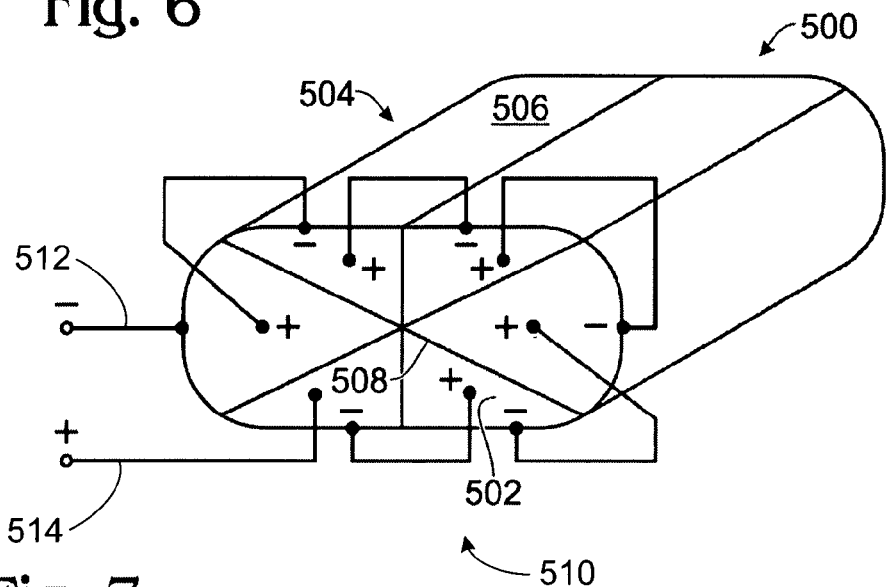
FIG. 6 is a schematic view of another exemplary embodiment of a catalytic device comprising a plurality of fuel cell portions.

While the embodiment of FIG. 5 illustrates the combination of two fuel cell structures in series, it will be appreciated that more than two fuel cell structures may be combined in series to achieve even higher output voltages. FIG. 6 shows, generally at 500, a view of an exemplary embodiment of an internal structure of a catalytic device having a plurality of fuel cell structures connected in series. Internal structure 500 has the configuration of a three-way catalyst honeycomb brick. Exhaust gases flow into a front face 502 of internal structure 500 and through small channels formed by a honeycomb-like interior structure (not shown) defining a plurality of small channels through which exhaust gases may flow. Internal structure 500 also has a continuous outer wall 504.

As described above in regards to the embodiment of FIG. 2, internal structure 500, including outer wall 504, may include a support formed from or coated with a solid electrolyte configured to conduct, for example, oxygen ions. Internal structure 500 may also include a first electrode material (for example, an anode material) formed over an interior surface of the honeycomb channels of structure 500, and a second electrode material (for example, a cathode material) formed over outer surface 506 of wall 504, thereby forming a fuel cell structure. A catalytic converter structure (for example, a three-way catalyst wash coat) may be disposed over either or both of the first electrode material and the second electrode material.

A plurality of separations 508 may be formed through the electrode layers of internal structure 500, thereby electrically isolating sections of the electrode layers from one another to form a plurality of fuel cell portions 510. Separations 508 extend the length of internal structure 500 along a direction of exhaust flow through internal structure 500. As a result, each fuel cell portion 510 extends along a full length of internal structure 500. Alternatively, one or more fuel cell portions 510 may extend only partially along the length of internal structure 500.

Each fuel cell portion 510 may be linked in series to adjacent fuel cell portions 510, except that one anode 512 and one cathode 514 may be left unconnected to form an output 516. Such a configuration may act as a fuel cell stack to increase the output voltage of the device relative to a single fuel cell. It will be appreciated that the fuel cell portions 510 may be electrically connected in any manner to form any suitable number of outputs. Furthermore, while the depicted internal structure 500 includes six separate fuel cell portions 510, it will be appreciated that an internal structure for a catalytic device may have either a greater or lesser number of separate fuel cell portions.

Figure 7:
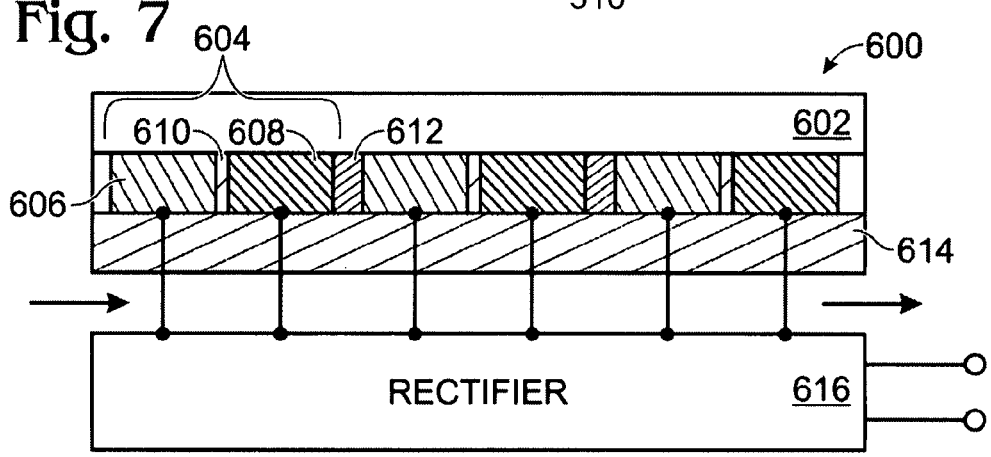
FIG. 7 is a schematic view of another exemplary embodiment of a catalytic device comprising a plurality of fuel cell portions.

FIG. 7 shows, generally at 600, a schematic depiction of another exemplary embodiment of a catalytic device having a three-way catalytic portion and a plurality of fuel cell portions formed on a support 602. Catalytic device 600 is configured to utilize an oscillating rich/lean exhaust air/fuel ratio to generate an electrical potential along a length of the catalytic device in a direction of air flow. Each fuel cell portion is shown at 604, and includes a first electrode structure 606, a second electrode structure 608, and a solid electrolyte 610 disposed between first electrode structure 606 and second electrode structure 608. Individual fuel cell portions 604 may be separated by an insulating layer 612 configured to prevent current flow between adjacent fuel cell portions 604. In contrast to the other embodiments described above, both electrode structures 606 and 608 are disposed on an interior surface of support 602. Therefore, there is no need to deliver an oxidant or a fuel to an electrode disposed on an outer surface of support 602. Furthermore, a catalytic conversion structure 614 may be disposed partially or fully over or adjacent to electrode structures 606 and 608, electrolyte 610 and insulating layer 612.

As described above, engine 10 may be configured to produce alternating periods of rich and lean exhaust. Such oscillations or variations in the air/fuel ratio may be used, for example, to operate an ordinary three-way catalyst. These variations may be configured to occur independently of engine speed and torque operating conditions, and instead may be configured to be a function of the chemical storage potential of the three-way catalyst to control oxygen storage in the catalyst for proper catalyst function. These variations create, at any given time, a chemical potential between two points along the length of catalytic device 600 due to variations in the concentrations of unoxidized/partially oxidized exhaust components and oxygen in the exhaust. As the variations in exhaust composition propagate through catalytic device 600, the chemical potential may be utilized by fuel cell portions 604 to generate electrical potentials across the fuel cell portions 604. The outputs from the fuel cell portions 604 may be rectified via a suitable rectification circuit 616, thereby producing an output voltage for use by electrical systems of engine 10, or other electrical devices.

Catalytic device 600 may have any suitable number of fuel cell portions 604 arranged along its length. The number and/or positioning of fuel cell portions 604 may be based on any suitable factors, including but not limited to the frequency, spacing and/or velocity of the variations in exhaust composition that propagate through catalytic device 600. Likewise, the number and/or positioning of fuel cell portions 604 may depend upon a desired output voltage or current of fuel cell portions 604.

It will be appreciated that the embodiments of catalytic devices disclosed herein are exemplary in nature, and that these specific embodiments are not to be considered in a limiting sense, because numerous variations are possible. The subject matter of the present disclosure includes all novel and nonobvious combinations and subcombinations of the various catalytic conversion portion and fuel cell portion configurations, and other features, functions, and/or properties disclosed herein. The following claims point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. An apparatus, comprising:
an engine; and
an exhaust system for conducting exhaust emitted by the engine and including a catalytic device configured to generate a voltage and to treat emissions from the engine, the catalytic device including:
a support having an interior surface and an exterior surface;
a fuel cell portion including a cathode structure adjacent the exterior surface and an anode structure adjacent the interior surface; and
a catalytic conversion portion disposed adjacent the fuel cell portion and configured to supply heat to the fuel cell portion.

2. The apparatus of claim 1, wherein the catalytic conversion portion comprises a three-way catalytic structure formed on at least a portion of the anode structure.

3. The apparatus of claim 1, further comprising a casing containing the support.

4. The apparatus of claim 3, wherein the support comprises an upstream end sealed to the casing via a seal that seals the exterior surface from exhaust flowing within the exhaust system.

5. The apparatus of claim 3, wherein the casing comprises an oxidant inlet configured to provide an oxidant to the cathode for consumption in the fuel cell portion.

6. The apparatus of claim 5, wherein the oxidant inlet is configured to provide air to the cathode.

7. The apparatus of claim 5, wherein the oxidant inlet is configured to provide lean exhaust to the cathode.

8. The apparatus of claim 1, wherein the fuel cell portion is a first fuel cell portion, and wherein the catalytic device further comprises a second fuel cell portion.

9. The apparatus of claim 8, wherein the catalytic device comprises a support having an interior surface and an exterior surface, and wherein the first fuel cell portion and the second fuel cell portion each includes a cathode formed on a portion of the exterior surface of the support and an anode formed on a portion of the interior surface of the support.

10. The apparatus of claim 8, wherein the catalytic device further comprises a third fuel cell portion.

11. The apparatus of claim 8, wherein the first fuel cell portion is electrically connected to the second fuel cell portion in series.

12. A catalytic device for treating emissions from an engine, the catalytic device comprising:

a support structure having an exterior surface and an interior surface, wherein the support structure includes a solid electrolyte material;

a layer of an anode material disposed on at least a portion of the interior surface of the support structure;

a layer of a cathode material disposed on at least a portion of the exterior surface of the support structure; and a three-way catalytic layer disposed on at least a portion of the layer of the anode material and configured to supply heat to the anode material by catalyzing a heat-producing reaction.

13. The catalytic device of claim 12, wherein the anode material is disposed over substantially a whole of the interior surface of the support structure.

14. The catalytic device of claim 12, wherein the cathode material is disposed over substantially a whole of the exterior surface of the support structure.

15. The catalytic device of claim 12, wherein the layer of the cathode and the layer of the anode material are each divided into a plurality of sections to form a plurality of fuel cell portions.

16. The catalytic device of claim 15, wherein each section extends substantially a length of the support in a direction of exhaust flow.

17. The catalytic device of claim 15, wherein the plurality of fuel cell portions are electrically connected in series.

18. The catalytic device of claim 12, further comprising a casing having an oxidant inlet configured to supply an oxidant to the cathode material.

19. An apparatus, comprising:

an engine; and an exhaust system for conducting exhaust emitted by the engine and including a catalytic device configured to generate a voltage and to treat emissions from the engine, the catalytic device comprising:

a support having an interior surface and an exterior surface;

a plurality of fuel cell portions, each of the plurality of fuel cell portions comprising a cathode formed adjacent to a portion of the exterior surface of the support and an anode formed adjacent to a portion of the interior surface of the support; and a catalytic conversion portion disposed adjacent at least one of the plurality of fuel cell portions.

20. The apparatus of claim 19, wherein each anode and each cathode extend substantially a length of the support along a direction of exhaust flow.

21. The apparatus of claim 19, wherein the catalytic conversion portion comprises a three-way catalytic structure formed on at least a portion of the anode structure.

22. The apparatus of claim 19, further comprising a casing containing the support.

23. The apparatus of claim 22, wherein the support comprises an upstream end sealed to the casing via a seal.

24. The apparatus of claim 22, wherein the casing comprises an oxidant inlet configured to provide an oxidant to the cathodes for consumption in the plurality of fuel cell portions.

25. The apparatus of claim 24, wherein the oxidant inlet is configured to provide air to the cathode.

26. The apparatus of claim 24, wherein the oxidant inlet is configured to provide lean exhaust to the cathode.

27. The apparatus of claim 19, wherein at least two fuel cell portions of the plurality of fuel cell portions are electrically connected in series.

28. The apparatus of claim 1, where the fuel cell portion is configured to consume unoxidized and/or partially oxidized exhaust components of the exhaust.

29. The apparatus of claim 1, where the catalytic conversion portion and the fuel cell portion share a common internal structure.

30. The apparatus of claim 1, wherein the catalytic conversion portion is further configured to reform hydrocarbons in the exhaust emitted by the engine to form more fuel for the fuel cell portion.

* * * * *